United States Patent [19]
Liao et al.

[11] Patent Number: 5,442,434
[45] Date of Patent: Aug. 15, 1995

[54] METHOD FOR FINDING AND MEASURING OPTICAL FEATURES USING AN OPTICAL TIME DOMAIN REFLECTOMETER

[75] Inventors: David D. Liao, Scarborough; Andrew E. Forber, Mississauga, both of Canada

[73] Assignee: Antel Optronics Inc., Burlington, Canada

[21] Appl. No.: 143,037

[22] Filed: Oct. 29, 1993

[51] Int. Cl.$^6$ ............................................. G01N 21/88
[52] U.S. Cl. ................................................. 356/73.1
[58] Field of Search .................................... 356/73.1

[56] References Cited

U.S. PATENT DOCUMENTS 4,968,880  11/1990  Beller ........................ 356/73.1 X
5,155,439  10/1992  Holmbo et al. ................... 324/534

FOREIGN PATENT DOCUMENTS 60-253836  12/1985  Japan ........................... 356/73.1

*Primary Examiner*—Vincent P. McGraw
*Attorney, Agent, or Firm*—Bereskin & Parr

[57] ABSTRACT

A method for identifying optical features along the length of a fiber optic cable in response to injecting a pulse of light into the fiber optic cable and collecting data corresponding to signals which are reflected, the method comprising the steps of: identifying potential optical features in the data according to a first set of parameters; constructing a pattern for selecting optical features from said potential optical features; fitting said pattern to said optical features; determining a position along the cable for each of said optical features; and computing a reflectance/loss level for each of said optical features.

10 Claims, 7 Drawing Sheets

METHOD FOR FINDING AND MEASURING OPTICAL FEATURES USING AN OPTICAL TIME DOMAIN REFLECTOMETER

FIELD OF THE INVENTION

This invention relates to optical time domain reflectometry. More particularly, it relates to a method for finding and identifying features along the length of a fiber optic cable and determining the reflectance level of said features.

BACKGROUND OF THE INVENTION

An optical time domain reflectometer (OTDR) is an instrument used to measure attenuation in a fiber optic cable. The OTDR allows the fiber attenuation to be correlated to the length or distance along the fiber cable. The OTDR has the advantage that it requires neither cutting the fiber nor the need to access both ends of the fiber.

In operation, a pulse of light is launched into the fiber in the forward direction by using either a directional coupler or a system of external lenses and a beam splitter. The waveform of the return light pulse is detected by a photo-detector and processed with a boxcar integrator (to improve the signal-to-noise ratio, i.e. SNR). The return waveform comprises three segments or components: (1) an initial pulse; (2) a long tail caused by back-scattering; and (3) pulses caused by discrete reflections. The three segments or components comprise optical features. The initial pulse results from any lack of directionality in the input coupling mechanism. The long tail caused by scattering results from Rayleigh scattering that occurs as the input light pulse propagates down the fiber and the reflection or pulses are caused by mismatched connectors or changes in the dielectric interface for example.

Rayleigh scattering is the major factor contributing to attenuation of an optical signal propagating through an optical fiber. Rayleigh scattering is due to microscopic fluctuations in density and composition of the glass waveguide. For example, the fiber cable structure will have imperfections such as impurities, microscopic air bubbles, moisture, etc. The Rayleigh scattering is approximately constant over a given length of a particular optical fiber. As an optical pulse propagates direction along the fiber, a portion of the light which is being scattered is captured by the waveguide structure of the fiber and propagated in the reverse direction, i.e. back to the OTDR. The power level of the back-scattered signal decreases along the length of the fiber because the level of transmitted pulse and the back-scattered light is attenuated over greater lengths of the fiber. The backscattered light typically has a very low level which is inversely proportional to the wavelength of the light raised to the fourth power.

The pulses caused by discrete reflections occur along the fiber length as a result of fiber imperfections, in-line connectors, breaks, or the Fresnel reflection of the end of the fiber. Fresnel reflection also occurs at the connectors because of the glass-air-glass dielectric interface. The level of this reflected light energy is at a relatively high level (relative to the backscattered light) and can be up to four percent of the incident light beam. The Fresnel reflected light level does not change nearly as much as a function of frequency and mode as the level for the Rayleigh backscatter. Thus, to observe the Rayleigh backscatter level and the Fresnel reflection requires an amplifier having a large dynamic range and sensitivity.

The optical time domain reflectometer has become a valuable diagnostic tool for aiding in the detection and measurement of optical features along the length of the fiber. The OTDR generates a fiber response trace by injecting a light pulse into the fiber and detecting and analyzing the characteristics of the backscattered light (i.e. Rayleigh). Once the response trace is generated and displayed, the trace is evaluated for features and optical measurements are made by the operator. In known systems, identification of features and making of measurements are done by a human operator. It will be appreciated that the quality of the OTDR testing and analysis depends largely on the skill level of a human operator.

Therefore, there is a need for a method for automatically finding optical features and making measurements. Not only will this provide improved accuracy, it will also relieve the need for human labour in the optical time reflectometry process.

BRIEF SUMMARY OF THE INVENTION

It is a feature of the present invention to provide a method for automatically finding optical features and making measurements of the fiber optic cable.

In a first aspect, the present invention provides a method for identifying optical features along the length of a fiber optic cable in response to injecting a pulse of light into the fiber optic cable and collecting data corresponding to signals which are reflected, the method comprising the steps of: identifying potential optical features in the data according to a first set of parameters; constructing a pattern for selecting optical features from said potential optical features; fitting said pattern to said optical features; determining a position along the cable for each of said optical features; and computing a reflectance/loss level for each of said optical features.

BRIEF DESCRIPTION OF THE DRAWINGS

For a better understanding of the present invention, and to show more clearly how it may be carried into effect, reference will now be made, by way of example, to the accompanying drawings in which.

DETAILED DESCRIPTION OF THE PREFERRED EMBODIMENT

Figure 1:
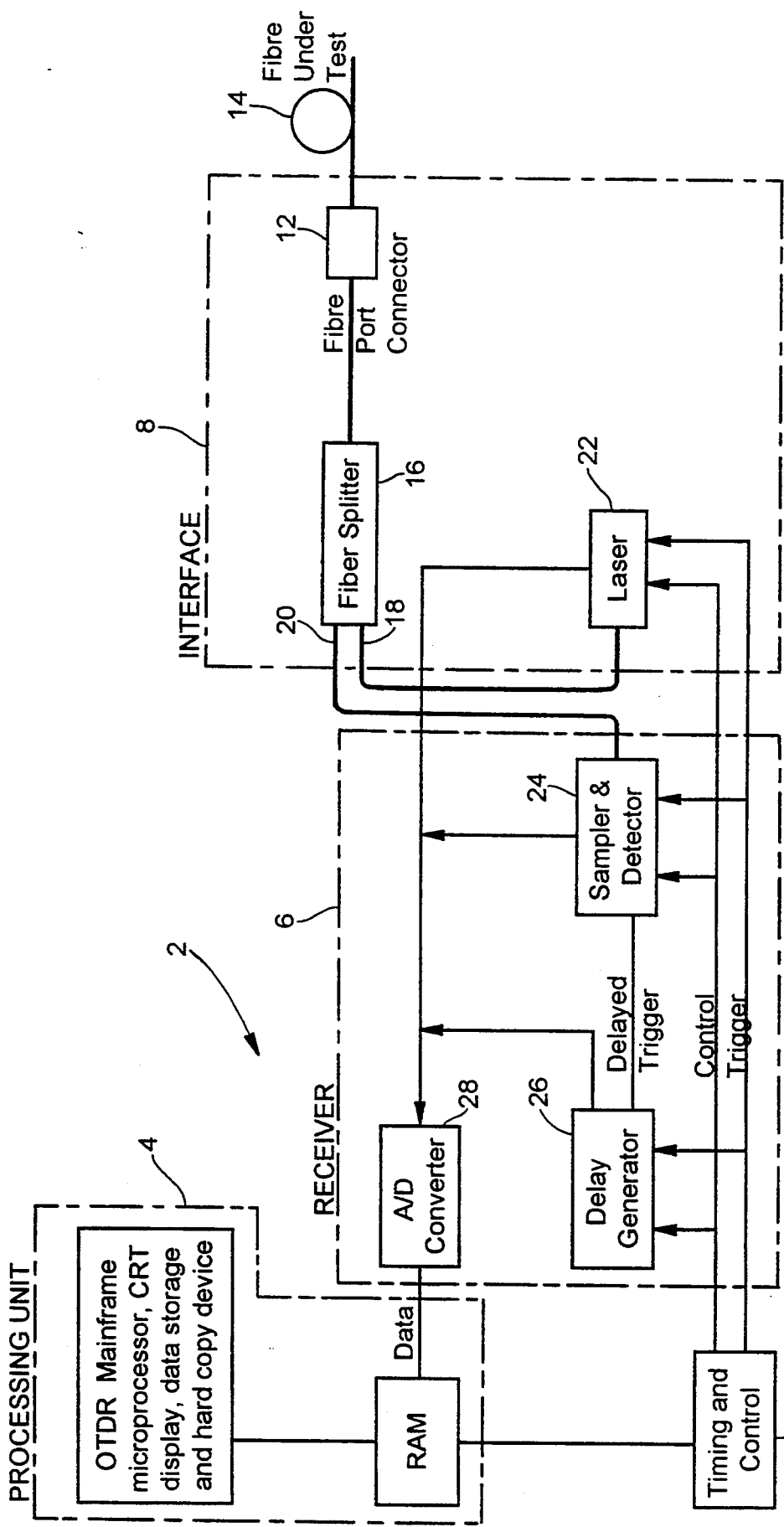
FIG. 1 shows in block diagram form an optical time domain reflectometer which is suitable for practising a method for finding optical features according to the present invention.

Reference is first made to FIG. 1 which shows an optical time domain reflectometer (indicated generally by reference 2) suitable for practising a method for finding and identifying optical events/features and determining the reflectance/loss level of the optical features according to the present invention. The optical time domain reflectometer operates as a one-dimensional optical radar which sends a series of high-power optical pulses down an optical fiber and measures reflected or backscattered light as a function of time. The measured data for the reflected and backscattered light is typically displayed as a function of distance along the length of the fiber cable.

As shown in FIG. 1, the optical time domain reflectometer 2 comprises a processing unit 4, a receiver 6, a fiber cable interface 8 and a timing and control unit 10. The processing unit 4 typically comprises a microprocessor, a CRT display, a data storage device (e.g. hard disk or diskette), and a hard copy device (e.g. a printer).

The interface module has a fiber coupler 12 which couples the OTDR 2 to the end of a fiber cable 14 which is to be tested by the OTDR 2. The other side of the fiber coupler 12 is connected to a fiber splitter 16. The fiber splitter 16 provides the coupler 12 with two ports 18,20. The first port 18 couples the fiber 14 to a laser diode 22 which is used to inject light pulses into the end of the fiber cable 14.

The receiver stage 6 comprises a sampler/detector 24, a delay generator 26, and an analog/digital converter 28. The other port 20 of the fiber splitter 16 is coupled to the sampler/detector 24. The sampler/detector 24 includes a photodetector (not shown), e.g. avalanche photodiode, which converts the reflected and backscattered light into an electrical current signal (not shown). (Features along the distance of the fiber cable cause portions of the light pulse generated by the laser diode (not shown) to be reflected and backscattered back to receiver stage). A suitable analog/digital converter 28 is disclosed in co-pending U.S. patent application Ser. No. 021,435 which is incorporated by reference herein.

The sampler/detector 24 includes an amplifier (not shown) which is coupled to the output of the photodetector. The function of the amplifier is to amplify the electrical signal to a level sufficient for further signal processing by the analog/digital converter 28. A suitable sampler/detector 24 is described in co-pending U.S. patent application Ser. No. 021,436 which is incorporated by reference herein. The amplifier is a transimpedance amplifier which in known manner converts the current signal into an output voltage signal is converted into a digital signal by the analog/digital converter 28 which is inputted by the processing unit 4 and processed according to the method of the present invention to identify the optical features and compute the reflectance/loss levels of the identified features.

Figure 2:
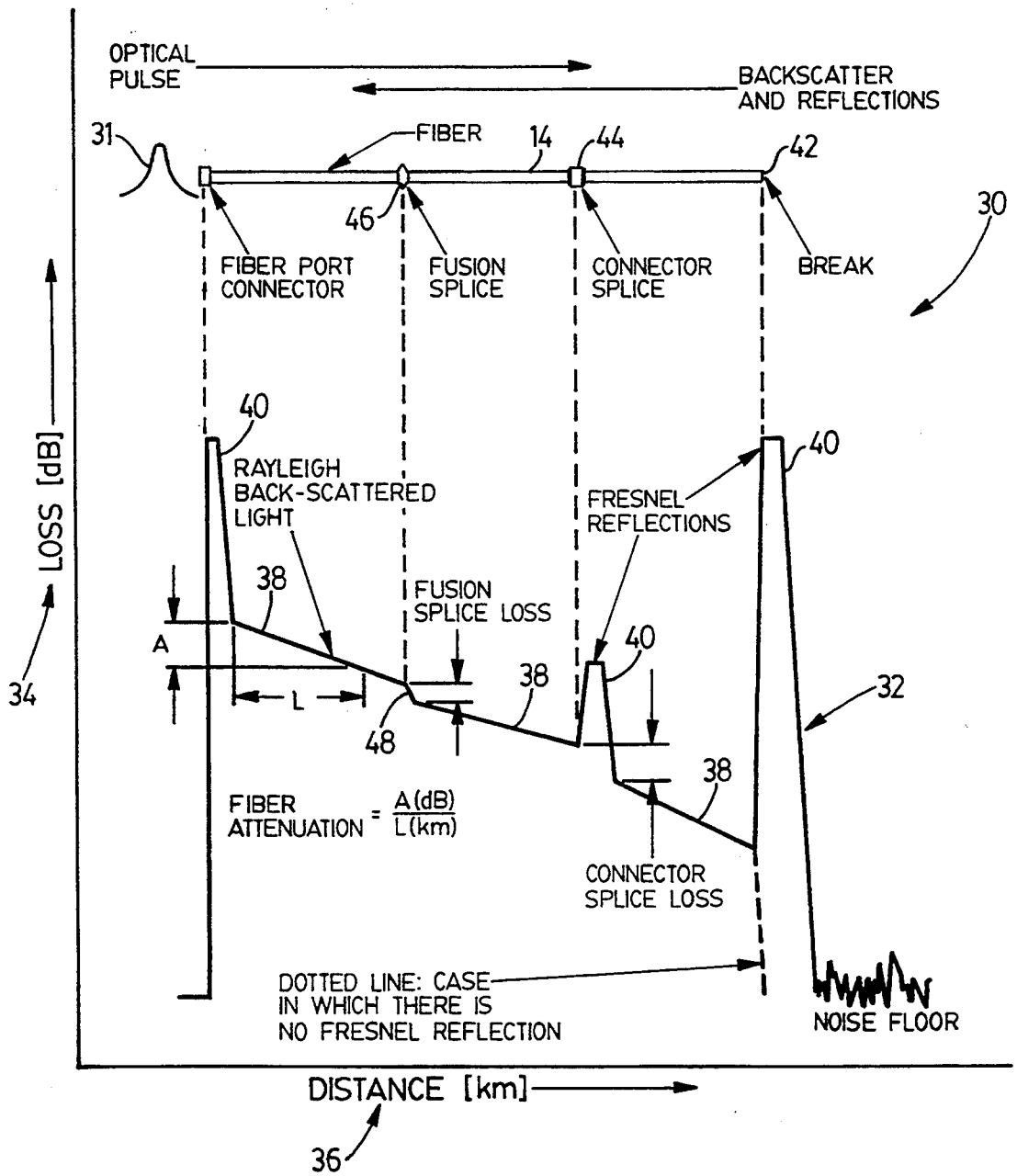
FIG. 2 shows in diagrammatic form optical features which are displayed by the OTDR of FIG. 1.

Reference is next made to FIG. 2 which shows in diagrammatic form a typical logarithmic domain display 30 that is produced by the OTDR 2 in response to a pulse of light being injected into the fiber cable 14. The display 30 comprises a response trace or fiber signature 32 which shows the optical features that were detected along the length of the cable 14 in response to a light pulse being injected into the cable 14. As will be understood by one skilled in the art, the optical features depicted by the trace 32 are the result of optical reflection and backscattering inside the fiber cable 14.

The response trace 32 shows the relative intensity of reflected light versus distance along the fiber 14 corresponding to the origin of the reflections along a vertical scale 34 and a horizontal scale 36 respectively. The reflected signal comprises two types of reflections: Rayleigh backscattered light and Fresnel reflections.

Rayleigh backscattering is typically the major cause of attenuation of an optical signal propagating through the fiber cable 14. Rayleigh scattering is due to microscopic fluctuations in density and composition of the glass waveguide comprising the cable 14. The Rayleigh scattering is approximately constant over a given length of a particular optical fiber. As an optical pulse 31 propagates along the fiber 14, a portion of the light which is being scattered is captured by the waveguide structure of the fiber and propagated in the reverse direction, i.e. back to the sampler/detector 24 in the OTDR 2. The Rayleigh backscattered light gives the response trace 32 a downward slope 38 (or Rayleigh trace) as shown in FIG. 2. The downward slope 38 of the response trace 32 signifies a decreasing level of backscattered signal power as the level of both the transmitted light pulse and the backscattered level is attenuated over greater lengths of the fiber 14. Thus, the relative decrease of the backscattered signal over a given length of the fiber cable 14 is equivalent to the level of fiber attenuation in that portion of the fiber cable 14. The fiber attenuation, typically stated as dB(decibels)/unit distance, is determined from the slope of the Rayleigh trace 38.

It will be appreciated by those skilled in the art that the Rayleigh scattering mechanism produces exponential decay in the linear domain. However, by displaying the response trace 32 (and Rayleigh trace 38) on a logarithmic scale, the exponential decay can is represented in a linear relationship. The exponential decay is due to the effect of Rayleigh backscattering because the farther down the cable 14 the pulse travels, the less backscattered light is detected.

As shown in FIG. 2, the response trace 32 also includes two other identifiable optical features. The first feature is a pulse 40. The pulse 40 represents a portion of the light pulse 31 which is reflected back (also termed a reflective event) to the receiver 6 and sampler/detector 24 (FIG. 1) as a result of Fresnel reflection. Fresnel reflection is caused by light reflecting at a discontinuity in the index of refraction for the fiber 14. Discontinuities can be caused, for example, by a break 42 in the fiber 14, by a connecter splice 44, by a fusion splice 46, or by the port connector 12 (FIGS. 1 and 2). The end of the fiber also denoted by reference 42 comprises a break and can cause a reflection because of the dielectric interface between the fiber 14 and the atmosphere. Similarly, the connector splice 44 can cause a reflection where the two ends of the cable 14 (i.e. glass core) have not been aligned and a dielectric interface is formed which reflects a portion of the light pulse back to the receiver 6 (FIG. 1). These Fresnel reflections can be termed "a splice with reflectance".

As shown in FIG. 2, the relative power level of a Fresnel reflection is usually several decibels or dBs greater than the background level of backscattered light (i.e. Rayleigh trace). This produces the event pulses or peaks 40 in the response trace 32 as shown in FIG. 2.

The positions of these event pulses 40 (whether relative to each other or relative to the OTDR port connector 12—see FIG. 1 above) can be measured directly from the horizontal axis 36 in distance units.

The other optical feature shown in FIG. 2 is a step 48 in the response trace 32. The step is indicative of "a splice without reflectance", i.e. a non-reflective optical event. At a splice without reflectance, e.g. at the fusion splice 46, a portion of the energy in the light pulse 31 is lost which accounts for the step 48 in the response trace 32. Similarly to the attenuation of the fiber 14, the loss in dBs associated with an optical component, for example a connector or coupler, can be measured from the response trace as the relative drop in the level of the Rayleigh backscattered light at the respective location or position of the step.

As will now be described, the present invention provides a method for locating these features and determining the reflectance or loss levels for the identified features.

Before considering FIG. 3 in detail, an overview of the method is provided. The first step according to the method involves inputting the trace data. The trace data comprises the light signals which have been reflected in the fiber cable back to the sampler/detector 24 and converted to digital data by the analog/digital converter 28 in the receiver 6 (FIG. 1). As discussed above, the trace data will contain the optical features which characterize the fiber cable being tested. The second step involves using the trace data to build a response trace. The method according to the present invention will process each trace data individually, i.e. pixel by pixel. It will be understood by those skilled in the art that the response trace is dependent on the width of the light pulse 31 (FIG. 2) injected by the laser diode, the actual structure of the splices along the fiber, and the response characteristics of the receiver stage. Because there can be noise in the system, the method will use certain parameters to locate and identify the optical features (e.g. event width, threshold, and reflectance) as will be described in detail below. The third step involves determining the loss or reflectance level for a splice which is to be detected. The next step involves tightening the selection criteria and selecting trace data which indicate a possible optical feature, e.g. a splice connector. The method then involves determining a position (along the cable) for the feature (e.g. splice). The position is determined by first constructing a pattern model for the trace data based on a Least Square Approximation (LSA); then calculating the squared error between the real trace model and the pattern model; and locally searching for the best fit position by using the minimum least square error principle. The next step involves building the response trace comprising a pattern for each splice location and a pattern for each span between two splice locations. The pattern for each span is also based on a least square approximation determination. The method then calculates the reflectance or loss level for each splice feature and the attenuation level for each span. As will be described in detail below, another aspect of the present invention comprises a method for computing the reflectance of an optical event. Lastly, a response trace or table is produced which shows the type of splice, its location, loss or reflectance level, and also the total fiber loss and attenuation. Table 1 contains the pseudo code for implementing the method according to the present invention.

Figure 3A:
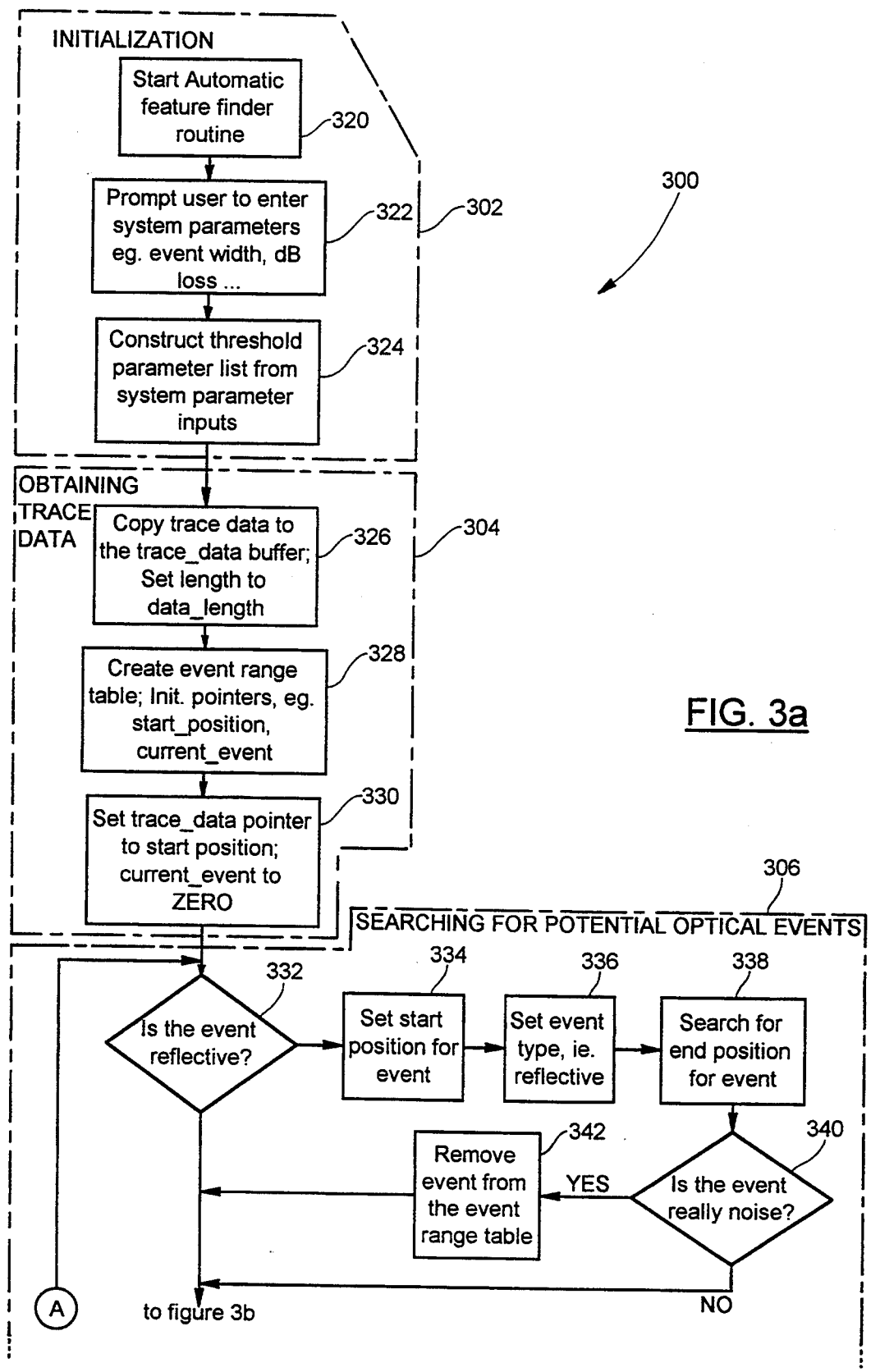
FIGS. 3(a) to 3(c) show in flow chart form a method for finding features and determining the reflectance/loss level of the features for use with an optical time domain reflectometer.
Figure 3B:
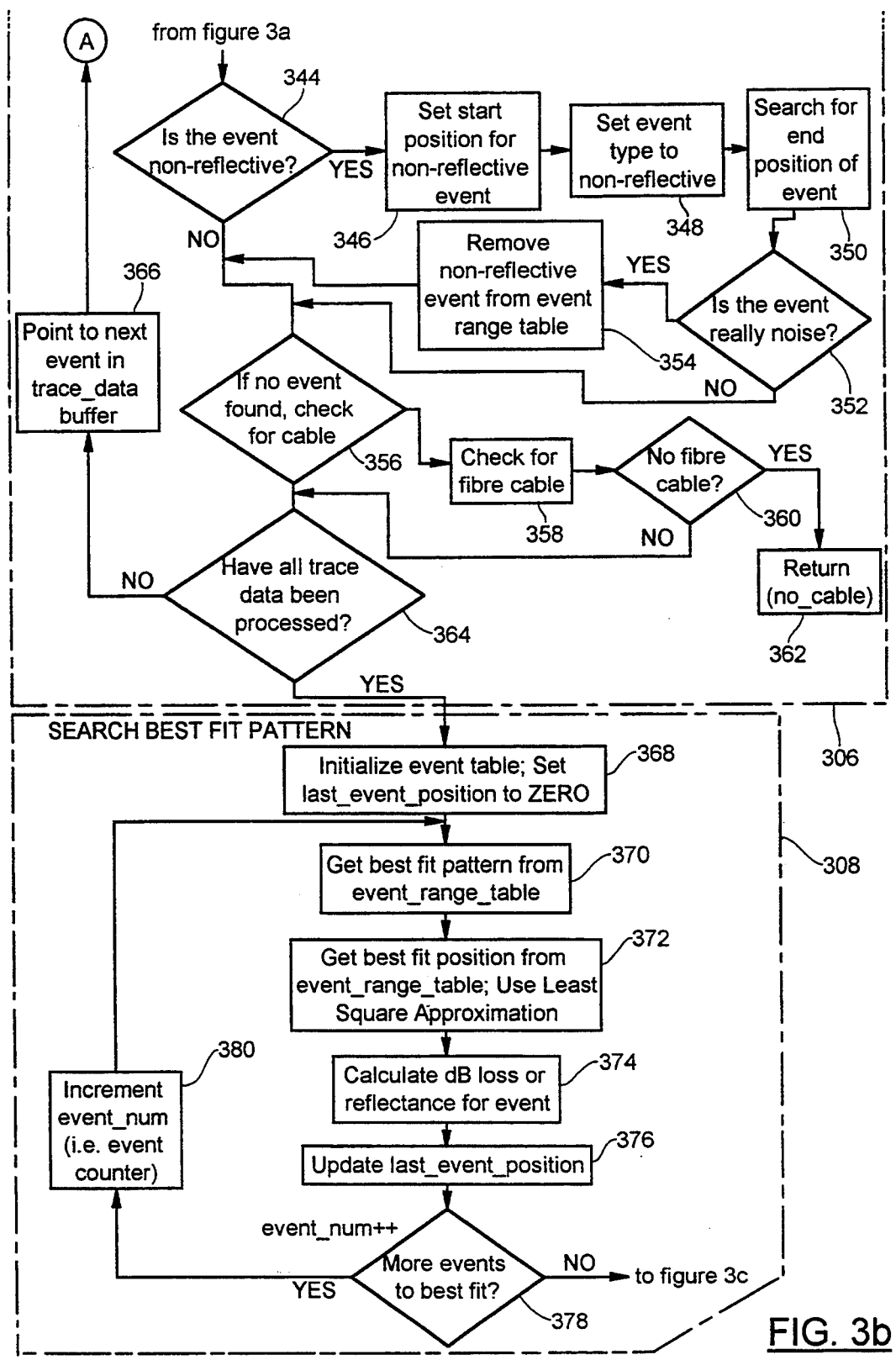
Figure 3C:
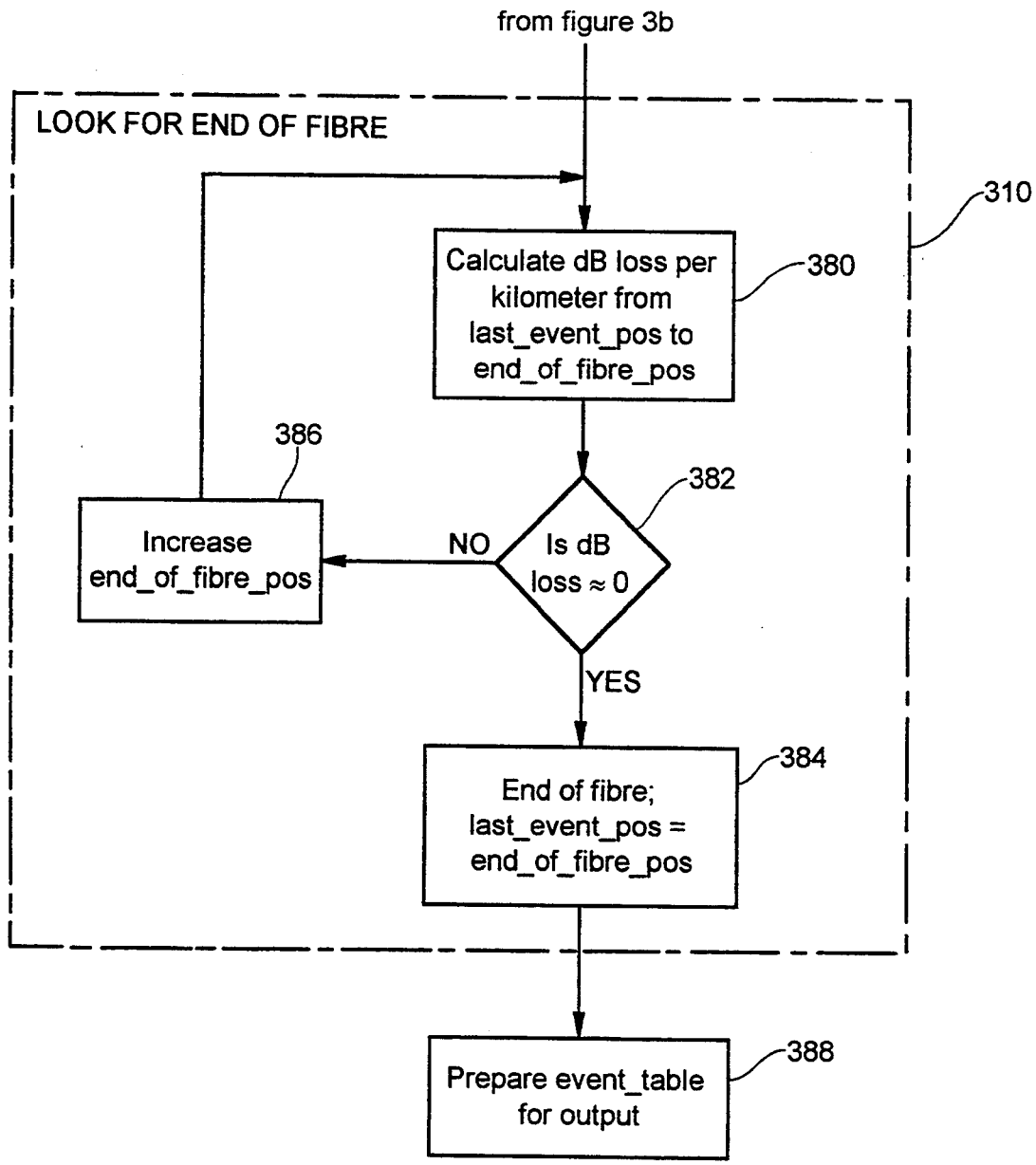

Reference is next made to FIGS. 3(a) to 3(c) which show in flow chart form the steps comprising a method for locating and computing the reflectance for optical features according to the present invention which will be termed a feature finder routine and denoted by reference 300. The feature finder routine 300 can be implemented as a function which is called or evoked by a computer program (main) which controls the OTDR 2. The method comprises five principle steps or functions. The first step involves initialization as indicated by block 302 shown in broken chain outline. The second step involves obtaining the trace data (as acquired by the receiver) in contemplation of processing, indicated generally by block 304. The third step involves searching for possible optical events. The fourth step involves locating valid optical events from those identified in the third step, and computing their reflectance (or loss) levels, as indicated generally by block 308. The fifth step involves producing a response trace or event table listing for the optical events and respective reflectance (or losses) and other parameters, indicated generally by block 310. The logic steps comprising each of these steps will now be described in detail.

When the feature finder routine 300 is called (block 320), the user can be prompted to enter the system parameters as indicated in block 322. The system parameters are used by the feature finder 300 to locate and identify optical events and compute their respective reflectance or loss levels (through the use of splice patterns as will be described below). The system parameters used by the feature finder 300 include an event width, a minimum reflectance level, and a minimum loss level. The event width specifies the minimum duration for an optical feature of interest. The minimum reflectance and loss levels specify the minimum level for an optical feature which is of interest to the user. The feature finder 300 uses the user defined system parameters to produce a list of threshold parameters (block 324). The threshold parameters correspond to the system parameters which have been relaxed. The feature finder 300 uses the threshold parameters to search for potential events in step 306 as will be described below.

The second functional block 304 involves making the trace data available to the feature finder 300 and creating an event_range_table. The trace data corresponds to the impulse response of the fiber cable. The trace data is obtained by injecting a laser pulse into the cable and sampling the signals which are reflected back to the receiver. Typically, the trace data will reside in a file which is stored in computer memory (or on a disk). To access the trace data, the feature finder 300 copies the trace data to a trace_data buffer in block 326. The trace_data buffer comprises a software structure which is used sequentially store the data corresponding to the reflected light signals which were detected by the receiver. The size of the trace_data buffer is given by a variable termed data_length. The event_range_table is created by the feature finder 300 in block 328. The event_range_table is a structure which is used by the feature finder 300 to process optical events in the trace data. The length of the event_range_table is defined by a variable ertable_length. The feature finder 300 uses the event_range_table for processing potential optical events which are located in the trace_data buffer. As shown in block 330, the feature finder 300 then sets a pointer to the beginning of the trace_data buffer and sets the value of a current_event variable to zero because no events have been identified yet. The feature finder 300 can now start searching the trace data for potential optical events.

The feature finder 300 searches the trace_data buffer for potential optical features, which can comprise: a reflective splice event, a non-reflective splice event, or an attenuation (see FIG. 2). As shown in FIG. 3(a), the feature finder 300 determines if the trace_data corresponds to a potential reflective splice event as indicated by decision block 332. If the potential event is a reflective event, then the feature finder 300 marks the event in the event_range_table, i.e. identifies the trace data as a potential optical event, and sets a start position for the reflective event in block 334. The feature finder 300 sets the event type, i.e. a reflective event, in block 336, and in block 338, the feature finder 300 sets an end position for the event. The start position and end position denote respectively the beginning and end of the trace data associated with the reflective event. Lastly in block 340, the feature finder 300 checks if the potential reflective event is merely noise. If the event is noise, then the feature finder 300 removes the entry from the event_range_table as shown in block 342.

Referring next to FIG. 3(b), if the potential event is identified as a non-reflective event at block 344, then the feature finder 300 sets a start position for the non-reflective event in block 346, and marks event type as a non-reflective event in the event_range_table as shown in block 348. The feature finder 300 then searches for the end of the non-reflective event and sets this as the end position in the trace data as indicated by block 350. Lastly in block 352, the feature finder 300 checks if the potential optical event is really just noise. If the event is noise, then the feature finder 300 removes the entry for the non-reflective event from the event_range_table.

If the feature finder 300 does not detect any potential events as determined in decision block 356, then a check is made to determine if a fiber cable is actually coupled to the OTDR as shown by block 358. If the feature finder 300 determines that there a fiber cable is not attached to the OTDR 2, then the feature finder routine 300 returns a value "no_cable" to the main program (which called the feature finder routine 300). If there is a fiber cable present, then the feature finder 300 checks if all the trace data has been processed for potential optical events as shown by decision block 364. The feature finder 300 uses the data_length variable to determine if all the trace data has been processed. If there is still trace data to process, the feature finder 300 moves or points to the next trace data as shown in block 366. The position of the next trace data is determined according to the event width (which was specified as a system parameter—see above).

Once the feature finder 300 has processed the trace data (block 364), the event_range_table will contain a list of the potential optical events which were identified in the previous step (block 306). In the next step (block 308), the feature finder 300 searches for the best fit patterns from the potential optical events which have been entered in the event_range_table. As will now be described, the feature finder 300 uses the best fit patterns to produce an event_table. The event_table comprises a list of optical events and includes the location, reflectance or dB loss for each event, i.e. events from the event_range_table which meet the system parameters.

Figure 7A:
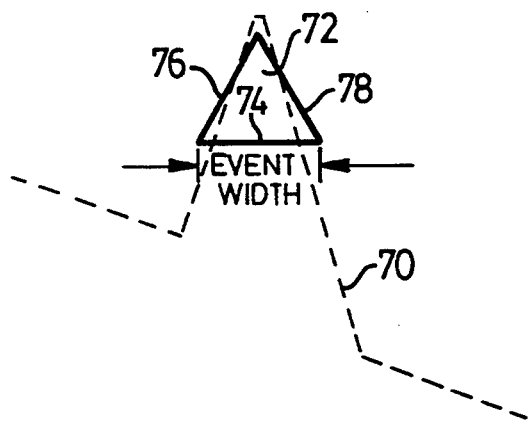
FIGS. 7(a) shows a best fit pattern which is utilized by the feature finder for reflective optical events.

The first step in searching the best fit pattern involves preparing the event_table by setting a last_event_pos pointer to zero as shown in block 368. The last_event_pos pointer is set to zero because the feature finder 300 has not yet searched any best fit patterns from the event_range_table. In block 370, the feature finder 300 searches for the best fit pattern of an event from the event_range_table. In searching for a reflective event 70, the feature finder 300 uses an isosceles triangle pattern 72 as shown in FIG. 7(a). The isosceles triangle pattern has a base 74, a rising side 76 and a falling side 78. The base 74 is fixed and equal to the event width. The rising and falling sides 76,78 both have the same slope which is determined by the pulse width of the laser and the acquisition or sampling time (i.e. the slope is dependent on the sampling rate of the sampler 24). To find the best fit pattern for a reflective event 70, the feature finder 300 matches the triangle pattern 72 against a reflective event entry in the event_range_table. This step can include calculating the least square error (between the trace data and the best fit pattern) and setting a credit level for the event. The credit level corresponds to the accuracy of the event, i.e. how close the identified event is to the pattern. The credit level can be used to filter events.

Figure 7B:
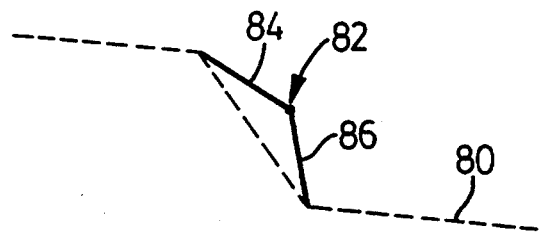
FIG. 7(b) shows a best fit pattern which is utilized by the feature finder for non-reflective optical events.

To search for a non-reflective event 80 in block 370, the feature finder 300 utilizes a pattern 82 as shown in FIG. 7(b). It will be remembered that a non-reflective event 80 signifies a loss in the reflected light signal and will appear as a step 48 (FIG. 2) or a downward sloping segment in the response trace, as shown in FIG. 7(b). The best-fit pattern for a non-reflective event 80 comprises two joined segments 84,86 of a second order polynomial curve. In known manner, the second order polynomial corresponding to the pattern 82 can be defined according to specified parameters. To determine the best fit pattern, the feature finder 300 uses a polynomial fit to the first few orders. For the pattern 82, the segments 84,86 have the same length (i.e. duration). Since the level for a non-reflective event can be very low, it is susceptible to noise. Therefore, the duration (threshold level) of the pattern is important to the matching process and the dB loss or reflectance level (threshold levels) must also be taken into account by the feature finder 300.

The feature finder 300 next determines a best fit position for the event as indicated in block 372. To determine the best fit position, the feature finder 300 performs a Least Square Approximation (LSA) or Minimum Least Square Error (MLSE) calculation. The feature finder 300 calculates the least square error and sets a credit level for the event. The credit level corresponds to the accuracy of the event, i.e. how close the identified event is to the pattern. The credit level can be used to filter events.

The feature finder 300 next calculates the dB loss for a non-reflective event or the reflectance level for a reflective event as shown in block 374. The dB loss or reflectance level is stored for each event in the event_table. A feature of the present invention is the method for computing optical reflectance and this will be described in detail with reference to FIGS. 4 to 6 below.

The best fit pattern processing is completed by updating the last_event_position pointer in block 376, i.e. moving the event pointer in the event_table. The feature finder 300 then checks if there are any more events in the event_range_table to be best-fitted as shown in decision block 378. If there are more events to be best-fitted, the feature finder 300 increments an event_number counter in block 380 and repeats the steps in blocks 370 to 376.

The next function performed by the feature finder 300 involves looking for the end of the fiber cable (block 310). To determine the end of the fiber position, the feature finder 300 calculates the dB loss from the last_event_position to a pre-selected end_of_fiber_position as shown in block 380. If the dB loss for this segment is approximately zero, i.e. there is no attenuation, then the trace data must be from the end of the fiber and the feature finder 300 marks the last_event_position as the end of the fiber. On the other hand, if the dB loss is not zero, then the feature finder 300 increases the end_of_fiber_position variable in block 386 and repeats the dB loss calculation in block 380.

Once the end of the fiber is determined, the feature finder 300 prepares the event_table for output as indicated in block 388. The feature finder 300 can display the event_table as either an Event Table Listing or as a Fiber Signature Trace. The Event Table Listing comprises a list of entries for each identified event and includes the event number, the event location (along the fiber), the event type, the event reflectance/dB loss, the span attenuation (from the previous event), and the total attenuation over the length of the fiber. The Fiber Signature Trace is shown in FIG. 1 and comprises a trace corresponding to the original trace data which has been overlaid by the features identified by the feature finder 300 as discussed above. The fiber signature is displayed on a logarithmic scale and includes markers for distance along the fiber.

TABLE 1

Automatic Feature Find Function

Auto_F_Find (system_parameter, event_table_pointer)
Inputs:
system_parameter - input parameters which include the event width, the dB loss or reflectance level of the event
event_table_pointer - a pointer to the memory location of the event_table
Outputs:
The function will create a new event table if successful.
Return Value:
ZERO - indicates that creating new event table was successful
NON-ZERO - indicates that function could not create an event_table.
- if return value is NOISY, then function could not process trace data because it contained too much noise.
- if return value is PARA_WRONG, then function could not create event_table because one or more of the system_parameters were wrong.
Pseudo Code for Automatic Feature Find Function
Auto_F_Find (system_parameter, *event_table_pointer)
structure SYSTEM_PARAMETER System_Parameter;
structure EVENT_TABLE_STRUCT Event_table [];
begin
    get algorithm Threshold Parameter from system_parameter;
      (1) hEvent_Width (i.e. half event width);
      (2) min_Reflect (i.e. event minimum reflectance);
      (3) min_dBloss (i.e. event minimum dB loss);
    get tracing averaging data to trace_data and length to data_length;
    create event_Range_Table for processing event and ERTable_Length is length;
    set current_Event to ZERO;
    find position of End_of_Dead_Zone and set to Start_Pos;
    search Event Range roughly
    for (pos = start_pos; pos < data_length_2*hEvent_Width; pos + +)
    begin
      if (pos is reflective event, start position)
      begin
        set event to Event_Range_Table;
        (a) set event range to start position TABLE 1-continued (b) set event type
        (c) search event range end position
        (d) if event is noise, then remove from
          Event_Range_Table
    end_of_if
    else
      if (pos is non reflective splice, start position)
      begin
        set event to Event_Range_Table;
        (a) set event range to start position
        (b) set event type
        (c) search event range to end position
        (d) if event is noise, then remove event
          form Event_Range_Table
      end_of_if
    if (pos = = certain value and no event in the
    Event_Range_Table)
    begin
      (a) calculate dB loss/kilometer
      (b) determine if there is a fiber cable present
        if (no cable present) then return
          (NO_CABLE)
    end_of_if
end_of_for
prepare Event_Table and set last_event_pos to ZERO
/* for each event range, search best fit pattern position */
for (even_num = 0; event_num < current_Event; event_num++)
begin
    (a) get best fit position from Event_Range_Table
    (b) calculate dB loss of the event
    (c) calculate Least Square Approximation error and
        set credit level of the event
    (d) update last_event_pos
end_of_for
look for end position fiber
    (a) calculate dB loss/kilometer from last_event_position
        for a selected distance
    (b) if dB loss/kilometer is close to ZERO, then
        last_event_position is the end of the fiber
return

Noise Analysis

Since "noise" can affect the accuracy of the response trace, the feature finder 300 includes an averaging step for alleviating the effect of any noise.

In an OTDR, there are two principle causes for noise. They are thermal noise and shot noise. Thermal noise originates within the photodetector's load resistor due to the random motion of electrons. Electrons within any resistor never remain stationary and because of their thermal energy the electrons will move even in the absence of an applied voltage. Shot noise, on the other hand, is produced at a junction or interface by the passage of charge carriers, e.g. electrons. The number of electrons which contribute to shot noise can be very large, and their random emission will be statistically independent of each other. Since both thermal and shot noise are random events, they are Gaussian distributed with zero mean. Therefore, averaging of the trace data is an effective way to minimize the effect of the Gaussian distributed noise. Furthermore, the polynomial fit processing step to determine the best fit pattern (block 370 in FIG. 3(*b*)) and the least square approximation processing step (block 372 in FIG. 3(*b*)) in the feature finder 300 can further minimize the effect of noise.

Figure 4A:
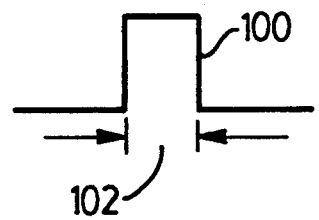
FIG. 4(a) shows in diagrammatic form the shape an optical reflection which is detected by the optical time domain reflectometer.
Figure 4B:
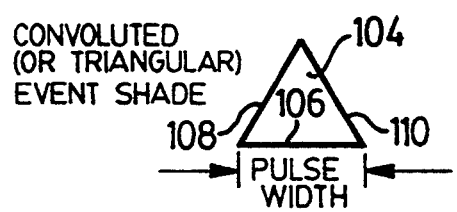
FIG. 4(b) shows in diagrammatic form an optical event/feature which is produced by the sampling of the optical time domain reflectometer of FIG. 1.
Figure 5:
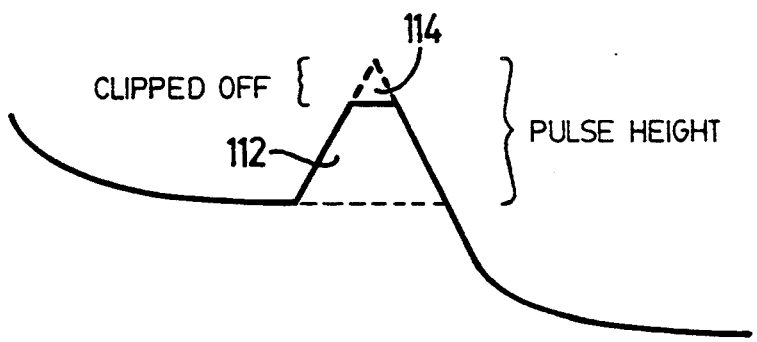
FIG. 5 shows in diagrammatic form an optical event which has been clipped.
Figure 6:
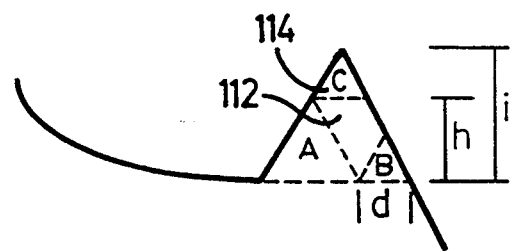
FIG. 6 shows a method for computing the optical reflectance of the reconstructed event of FIG. 5.

Reference will next be made to FIGS. 4 through 6 which describe in detail a method according to the present invention for computing the optical reflectance of an event as indicated in block 308 of FIG. 3(*b*).

Computation of Optical Reflectance

Reference is next made to FIGS. 4(a) and 4(b). In response to injecting a laser pulse 31 (FIG. 2) into one end of the fiber cable 14, the optical characteristics of the fiber 14 can be determined from the light which is reflected back to the receiver 6 (FIG. 1). The light energy which is reflected/scattered back to the receiver 6 comprises an event or pulse shape 100. As shown in FIG. 4(a), the event shape 100 has pulse width 102. The event pulse or shape 100 is detected by the sampler/detector 24. By the operation of the sampler/detector 24, the event shape or pulse 100 is convoluted into a triangular shape 104 as shown in FIG. 4(b). The triangular event shape 104 corresponds to the convoluted event pulse 100. The triangular event shape 104 comprises an isosceles triangle having a base 106 and rising and falling edges 108,110. The rising and falling edges 108,110 are fixed and can be determined from the width 102 of the event pulse 100 and the sampling aperture of the sampler/detector 24 (FIG. 1) as will be understood by one skilled in the art. In addition, the base 106 or pulse width can also be determined as will be described below.

The reflectance of an optical event (for example resulting from the connector splice 44 in FIG. 2) can be defined by the following formula which is according to the known Bellcore specification.

$$R = B_{ns} + 10 \log_{10}[(10^{0.2H} - 1)D]$$

Where:

R is the reflectance of the event, measured in decibels.

$B_{ns}$ the following is the fiber back scatter coefficient normalized for a one nanosecond pulse duration H is the height of the top of the Fresnel measured in decibels from the Rayleigh scatter signal immediately preceding the event.

D is the energy/power pulse duration in nanoseconds for a square pulse of equal energy to the actual sample pulse.

As described above, the feature finder routine 300 according to the present invention computes the reflectance of an event as shown in block 374 (FIG. 3(b)). The feature finder routine 300 utilizes the above formula in computing the reflectance. According to this method, all of the values except for D are either directly measurable or available from the manufacturers of the fiber optic cable. Because the (convoluted) event shape 104 under ideal circumstances is a triangle, which results from the operation of the sampler/detector 24 (FIG. 1), the pulse width (i.e. duration) 106 will not be equal to the pulse width 102 of the event pulse 100 as required by the above formula.

Therefore, the feature finder routine 300 includes a step for computing the duration of the equivalent square pulse by numerical integration of the Fresnel being measured. Integration is performed in the linear domain, and measures the area under the curve but under the level of the Rayleigh scattering which precedes the pulse. The effective pulse width is computed from this area by the following calculation:

$$D_{Effective} = Area/Height$$

It has been found that method embodied in the feature finder routine 300 yields results which are extremely close to those obtained with other test instruments and fibers with known end reflectance, provided that the event pulses 104 are of such a height that they are not clipped by the receiver 6 (FIG. 1).

Because the integration performed by the sampler/detector 24 is independent of the pulse shape, the method embodied in the feature finder routine 300 should also work with trace data from other OTDRs, i.e. an OTDR which does not use a boxcar integrator as incorporated in the sampler/detector 24.

Another feature of the method embodied in the feature finder routine 300 is the capability to compute the reflectance for an event shape which has been clipped. Because the amplitude of an event pulse is related to the reflectance, clipping will affect the accuracy of the fiber signature. Reference is made to FIG. 5 which shows a clipped event shape 112. The clipped portion of the event shape 112 is shown in broken line and indicated by reference 114. Clipping can result, for example, from "saturation" in the receiver 6. To compute the reflectance of the clipped event shape 112, the feature finder routine 300 includes a step which reconstructs the event shape 112 prior to computing the reflectance. The method according to the present invention allows the clipped portion of the reflection to be reconstructed fairly accurately even if the triangle is not an isosceles triangle. The feature finder routine 300 can restore the clipped portion 114 in two ways: (a) using a geometric-based technique; or (b) using a numerical technique, as will be described below.

Reference is made to FIG. 6 which shows the geometric-based reconstruction method. The clipped portion 114 of the event pulse 112 is reconstructed by noting that the clipped portion 114 is a triangle which is similar to the triangle representing the event pulse 112. As shown in FIG. 6, the clipped portion 114 is represented as triangle C and the clipped event 112 includes two smaller triangles A and B. The two triangles C and B are congruent and they are also similar to triangle A and to the triangle representing the reconstructed or unclipped event. The unclipped event (i.e. whole triangle) has a height "i" as shown in FIG. 6. The feature finder 300 utilizes the following formula to determine the unclipped height "i":

$$i = \frac{W \times h}{W - d}$$

The length "d" corresponds to the base of triangle C and the length W corresponds to the base of the event 112. According to the present invention, the length d can be measured by scanning the trace data for the point where the slope of the event 112 changes suddenly from near-vertical to near-horizontal. It will be appreciated by those skilled in the art, that when the clipping is severe, the length d for all practical purposes will almost equal the length W and therefore this technique will not be able to accurately perform the calculation.

A feature of the method according to the present invention is that it performs fairly accurately even when artifacts of the event pulse 100 result in curvature in the rising and falling edges 108,110 of the event shape 104 (see FIGS. 4(a) and 4(b)). Because the curvature is nearly equal on the two edges (i.e. 108 and 110), the geometrical relationship (i.e. similarity principle) described above will still apply.

The numerical technique for reconstructing the clipped event 104 utilizes regression. The regression method will work provided that the rising and falling edges of the triangle are nearly linear. The numerical technique utilizes a least-squares curve fit of the rising and falling edges 108,110 of the clipped event 104. The feature finder routine 300 uses the least-squares fit to yield an equation for the line representing each of the edges 108,110. The routine then solves the two equations simultaneously to obtain the intersection point which defines the apex of the clipped portion 114. The routine 300 uses this information to compute the area of the clipped portion 114. The routine can then calculate the pulse width and height of the clipped event 112 (FIG. 6). It will be appreciated that the numerical technique, while correct for cases in which the rising and falling edges 108,110 are linear, may suffer from numerical artifacts when the rising and falling edges 108,110 are curved.

It will be evident to those skilled in the art that other embodiments of the invention fall within its spirit and scope as defined by the following claims.

We claim:

1. A method for identifying optical features along the length of a fiber optic cable in response to injecting a pulse of light into the fiber optic cable and collecting data corresponding to signals which are reflected, the method comprising the steps of:
    (a) identifying potential optical features in the data according to a first set of parameters;
    (b) constructing a pattern for selecting optical features from said potential optical features;
    (c) fitting said pattern to said optical features and selecting optical features which meet a second set of parameters;
    (d) determining a position along the cable for each of said selected optical features; and
    (e) computing a reflectance/loss level for each of said selected optical features.

2. The method claimed in claim 1 wherein step (e) includes the step of identifying optical features which have been clipped and reconstructing the clipped portion of said clipped optical features prior to computing said reflectance/loss level.

3. The method claimed in claim 1 wherein step (e) includes the step of determining an effective pulse width for a selected optical feature having a triangular pulse shape.

4. The method claimed in claim 1 wherein the first set of parameters comprise an optical event width, an optical event reflectance level, and an optical event loss level.

5. The method claimed in claim 1 wherein said pattern comprises a best-fit triangle for selecting a reflective optical event.

6. The method claimed in claim 1 wherein said pattern comprises a polynomial curve for selecting a non-reflective optical event.

7. The method claimed in claim 1 wherein fitting said pattern in step (c) includes performing a least square approximation between said pattern and the optical feature.

8. The method claimed in claim 7 wherein said step of performing a least square approximation produces a credit level for defining the error between said pattern and the optical feature.

9. The method claimed in claim 1 wherein said step of determining a position along the cable comprises performing a least square approximation.

10. The method claimed in claim 1, 2, 5, 6, 7 or 8 further including the step of producing a fiber signature comprising said selected optical features and their respective reflectance/loss levels.

* * * * *